(12) United States Patent
Borrmann et al.

(10) Patent No.: US 7,201,550 B2
(45) Date of Patent: Apr. 10, 2007

(54) LASHING DEVICE FOR TYING LOADS IN A TRANSPORT CONVEYANCE

(75) Inventors: Carsten Borrmann, Achim (DE); Guenter Vogg, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/859,440

(22) Filed: Jun. 1, 2004

(65) Prior Publication Data

US 2004/0265088 A1 Dec. 30, 2004

(30) Foreign Application Priority Data

May 30, 2003 (DE) ................. 103 24 649

(51) Int. Cl.
*B60P 7/08* (2006.01)
(52) U.S. Cl. ................. 410/102; 410/104; 410/106; 410/107; 410/111
(58) Field of Classification Search ................. 410/103, 410/104–107, 110–112, 115–116; 244/118.1, 244/137.1; 248/499; 24/265 CD, 115 K
See application file for complete search history.

(56) References Cited

U.S. PATENT DOCUMENTS

| 3,693,920 | A |   | 9/1972  | Trautman          |
|-----------|---|---|---------|-------------------|
| 3,888,190 | A |   | 6/1975  | Bigge             |
| 4,493,470 | A |   | 1/1985  | Engel             |
| 4,715,754 | A | * | 12/1987 | Scully ........................ 410/107 |
| 4,741,653 | A |   | 5/1988  | Schmidt           |
| 4,850,769 | A |   | 7/1989  | Matthews          |
| 4,907,921 | A |   | 3/1990  | Akright           |
| 5,076,745 | A |   | 12/1991 | Klein             |
| 5,112,173 | A |   | 5/1992  | Eilenstein et al. |
| 5,234,297 | A |   | 8/1993  | Wieck et al.      |
| 6,030,159 | A | * | 2/2000  | Herrick et al. ............... 410/102 |
| 6,138,975 | A |   | 10/2000 | McDaid            |
| 6,374,466 | B1 |  | 4/2002  | Macias            |
| 6,533,512 | B2 |  | 3/2003  | Lin               |
| 2002/0168242 | A1 | | 11/2002 | Lin          |
| 2004/0258498 | A1 | | 12/2004 | Bruns        |
| 2004/0265087 | A1 | | 12/2004 | Bruns        |

FOREIGN PATENT DOCUMENTS

| DE | 2161735 | 7/1972 |
| DE | 3943077 | 7/1991 |
| DE | 4102274 | 1/1992 |
| EP | 0894713 | 2/1999 |

* cited by examiner

*Primary Examiner*—Stephen Gordon
(74) *Attorney, Agent, or Firm*—W. F. Fasse; W. G. Fasse

(57) ABSTRACT

Various load items, such as freight pieces or passenger seats are to be secured to the loading floor of a transport conveyance. For this purpose a lashing device is constructed for a lashing function performed by a tiltable lashing bail or a latching function performed by a mounting rail profile cooperating with an interconnecting or interlocking element when the lashing bail is in a recessed position in a housing to which the lashing bail is journaled and in which a mounting member (7) carrying the mounting rail profile (8) is secured. When the lashing bail is in a raised, active position the mounting rail profile is in an inactive state and vice versa.

17 Claims, 4 Drawing Sheets

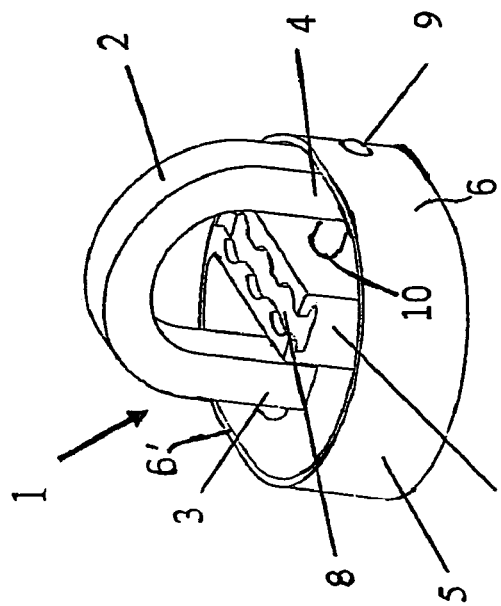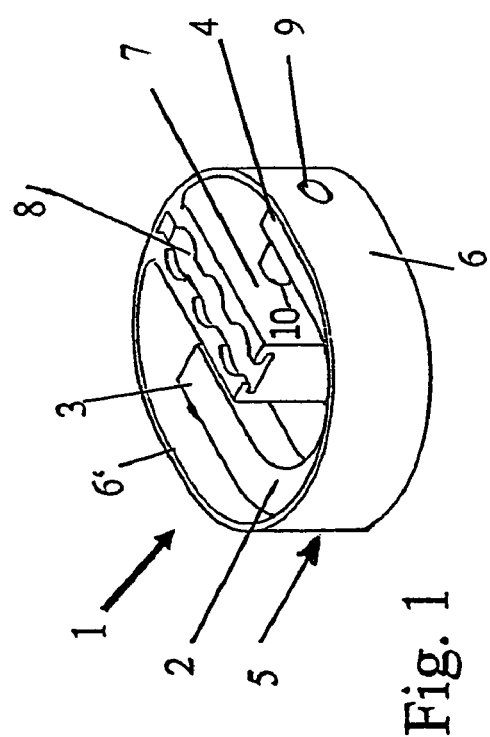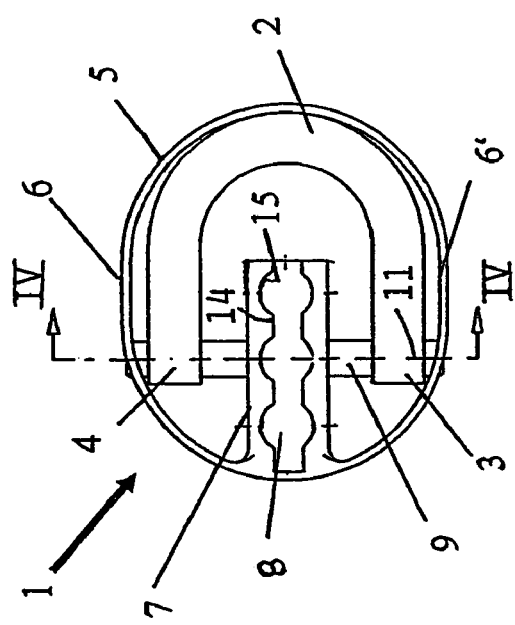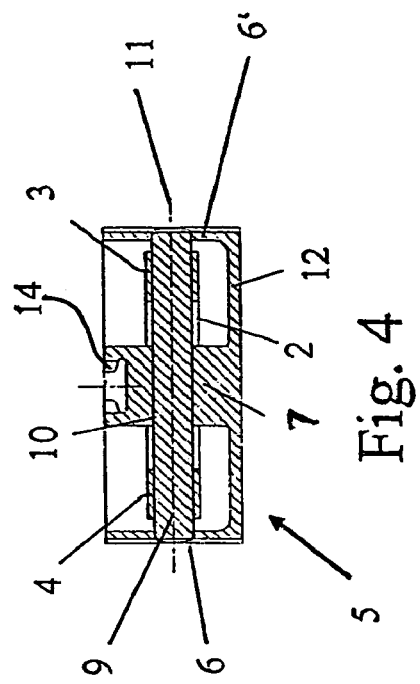

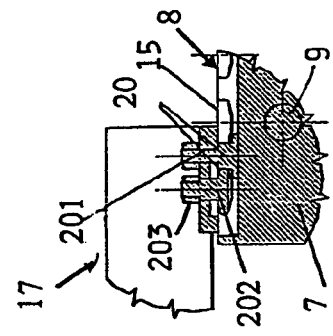
Fig. 7A
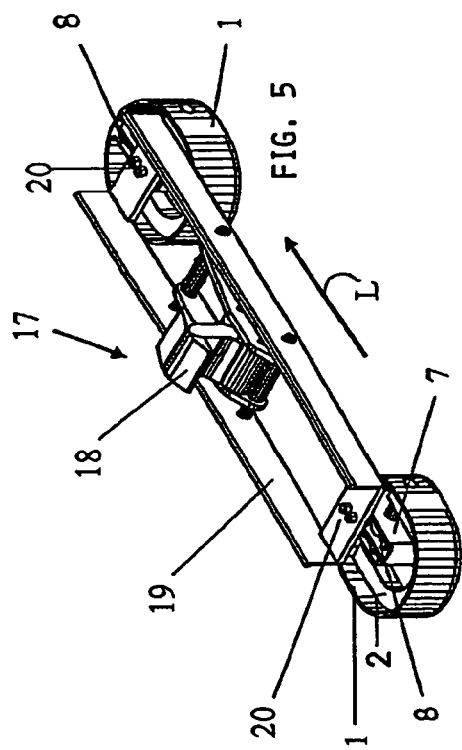
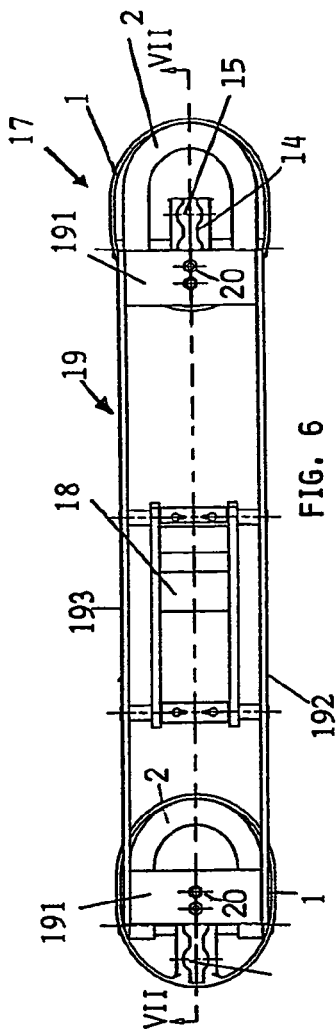
FIG. 6
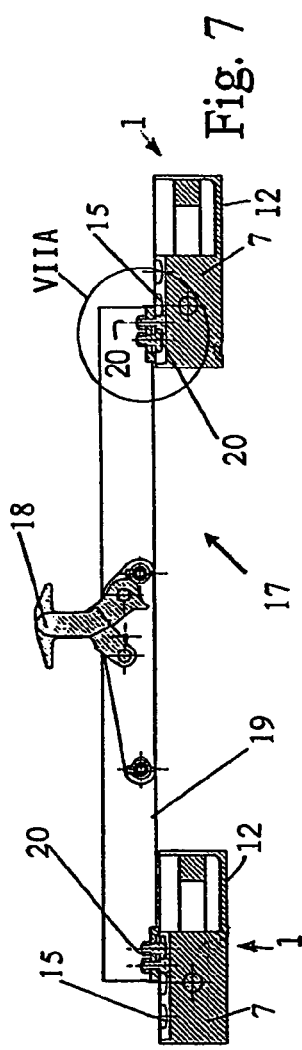
Fig. 7

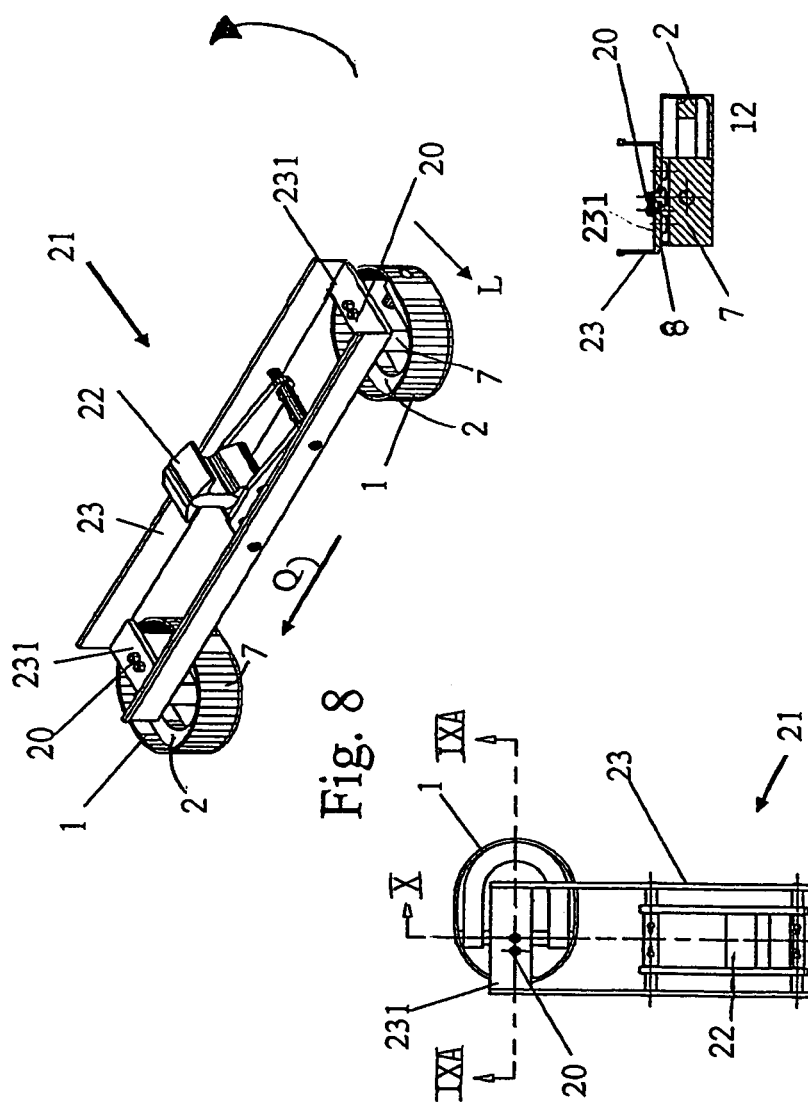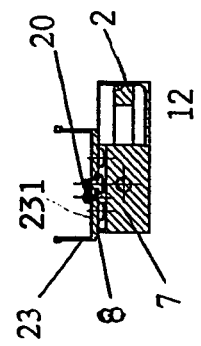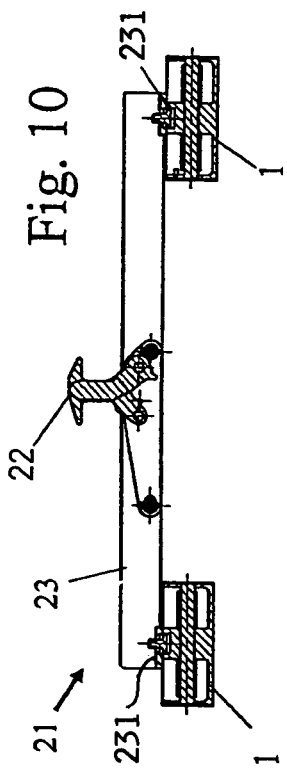

LASHING DEVICE FOR TYING LOADS IN A TRANSPORT CONVEYANCE

CROSS-REFERENCE TO RELATED APPLICATIONS

This application is related to U.S. application Ser. No. 10/859,443, and to U.S. application Ser. No. 10/859,437, both filed on Jun. 1, 2004.

PRIORITY CLAIM

This application is based on and claims the priority under 35 U.S.C. §119 of German Patent Application 103 24 649.5, filed on May 30, 2003, the entire disclosure of which is incorporated herein by reference.

FIELD OF THE INVENTION

The invention relates to a lashing device for a freight loading system of a transport conveyance particularly an aircraft. The lashing device is constructed for cooperation with latching or interlocking elements so that lashing of loads or latching or locking of loads can be performed selectively.

BACKGROUND INFORMATION

Transport conveyances such as aircraft are used for transporting, freight and/or passengers. In the transporting of freight items, certain items require lashing while other items require latching or locking the respective items to the loading floor. The carrying of passengers requires latching or interlocking passenger seats to the loading floor. The freight items to be transported may have a multitude of different features. There are standardized freight units referred to as unit load devices (ULDs). Such unit load devices include containers, pallets, or netting. Additionally, freight items may include nonstandardized goods, such as bags lashed to chip boards or even vehicles including heavy trucks and caterpillar tread vehicles. The relatively high loads that these goods represent, particularly when military goods are to be transported, impose very high requirements regarding static and structural features of the loading floor construction and of the required load lashing or load latching components or points.

Lashing points, or rather lashing devices are provided for securing loads to the loading floor by a lashing ring. The lashing points or devices are numerous and generally distributed at equal spacings all over the freight space, or rather the loading floor. The lashing ring of each lashing point is secured to the aircraft frame structure, customarily to the ribs or spars for example by screws, in order to take up large forces and moments in all directions. However, such lashing points or lashing devices are not usable for the transport of commercial freight pallets. Commercial freight pallets are required to be latched or locked down by so-called XZ-latching devices and YZ-latching devices.

German Patent Publication DE 39 43 077 or German Patent Publication DE 41 02 274 describe such conventional latching devices for locking commercial freight items or units within the freight loading system, more specifically to the loading floor of an aircraft. The lashing by means of lashing rings is not possible with these commercial load items because the items do not have any possibilities for securing the lashing rings to the freight items. The conventional latching or locking elements are positioned in predetermined stowing positions for locking freight units in these positions. For example, so-called XZ-latching devices are known, which are capable of securing a load in the longitudinal or X-direction of an aircraft as well as in the vertical or Z-direction. Such locking of a freight unit or freight item is possible because a latching hook grips a projection or into a recess of the freight item. Conventional YZ-latches grip laterally into the freight item, thereby providing an interlock in the lateral or Y-direction and in the vertical or Z-direction. The use of such conventional latching devices, however, requires a rigid mounting of these latching devices on or in the loading floor of a freight deck. Thus, in addition to the required lashing points, a multitude of latching points would have to be provided for the interlocking or latching elements in order to transport freight items that cannot be lashed to the loading floor because these freight items do not have any connecting elements or points for cooperation with the lashing ring.

OBJECTS OF THE INVENTION

In view of the foregoing it is the aim of the invention to achieve the following objects singly or in combination:
to provide a lashing device capable of facilitating the transport of any type of freight items, either by lashing these freight items to a loading floor, or by cooperating with a latching device for latching freight items to the loading floor;
to construct such a latching device so that a lashing bail in its working position permits the lashing while in its recessed position permits a cooperation with a latching device;
to permit a rapid change-over from a lashing operation to a latching operation by a minimum of service personnel in the shortest possible time; and
to make the lashing device universally adaptable to any freight transporting requirement and to any passenger carrying requirement.

SUMMARY OF THE INVENTION

The present lashing device for securing a load to a loading floor in a transport conveyance such as an aircraft is characterized by a housing and a lashing bail that is journaled in the housing by at least one journal pin, whereby the lashing bail can assume an upright working position or a recessed position in the housing. Further, a mounting member is rigidly mounted in the housing, preferably in a space between legs of the lashing bail. The mounting member is equipped with a mounting rail profile for securing at least one interconnecting element to the mounting member for locking a load through the mounting member to the loading floor when the lashing bail is in its recessed position in the housing. In the recessed position of the lashing bail the mounting member becomes accessible for the securing of at least one interconnecting element that will permit the latching of freight items or passenger seats.

It is a particular advantage of the lashing device according to the invention that it permits a rapid change-over between lashing and latching operations in a freight loading system in accordance with any particular transport or carrying requirements. Such change-over can be performed in a reliable manner. The present lashing devices realize a double function that is made possible by flapping the lashing bail from its operating upright position into a recessed position and vice versa. If there is no need to lash freight items by the lashing elements, it becomes immediately possible when the lashing bail is recessed, to secure an interconnecting element to the lashing device by using the structure of the mounting rail profile for the arresting or interlocking of latching elements or possibly any other components of the freight loading system.

Another advantage of the invention is seen in that a weight reduction has been achieved because in addition to providing a lashing point, other components can be latched to the lashing device without any additional structural components. For example, passenger seats can be directly secured as the "interconnecting element" to the mounting rail profile.

According to the invention there is further provided a freight lashing and latching system which employs at least two of the present lashing devices interconnected by an interconnecting element having a first end latched or locked to the mounting member of the first lashing device and a second end latched or locked to the second lashing device when the lashing bail of each of the first and second lashing devices is in its recessed position. The interconnecting element may, for example carry at least one latching device.

BRIEF DESCRIPTION OF THE DRAWINGS

In order that the invention may be clearly understood, it will now be described in connection with example embodiments thereof, with reference to the accompanying drawings, wherein:

FIG. 1 is a perspective view of a first embodiment of a lashing device according to the invention with the lashing bail in a recessed position;

FIG. 2 is a perspective view illustrating the lashing bail in an upright working position;

FIG. 3 is a top plan view of the lashing device according to FIG. 1;

FIG. 4 is a sectional view along section line IV—IV in FIG. 3;

FIG. 5 is a perspective view of a freight latching device using two freight lashing devices according to the invention to form an XZ-latch;

FIG. 6 is a top plan view of the XZ-latch of FIG. 5;

FIG. 7 is a sectional view along section line VII—VII in FIG. 6;

FIG. 7A is an enlarged view of the content of circle VIIA in FIG. 7;

FIG. 8 is a perspective view of a freight latching device using two freight lashing devices according to the invention to form a YZ-latch;

FIG. 9 is a plan view of the YZ-latch of FIG. 8;

FIG. 9A is a sectional view along section line IXA—IXA in FIG. 9;

FIG. 10 is a sectional view along section line X—X in FIG. 9; and

Figure 11:
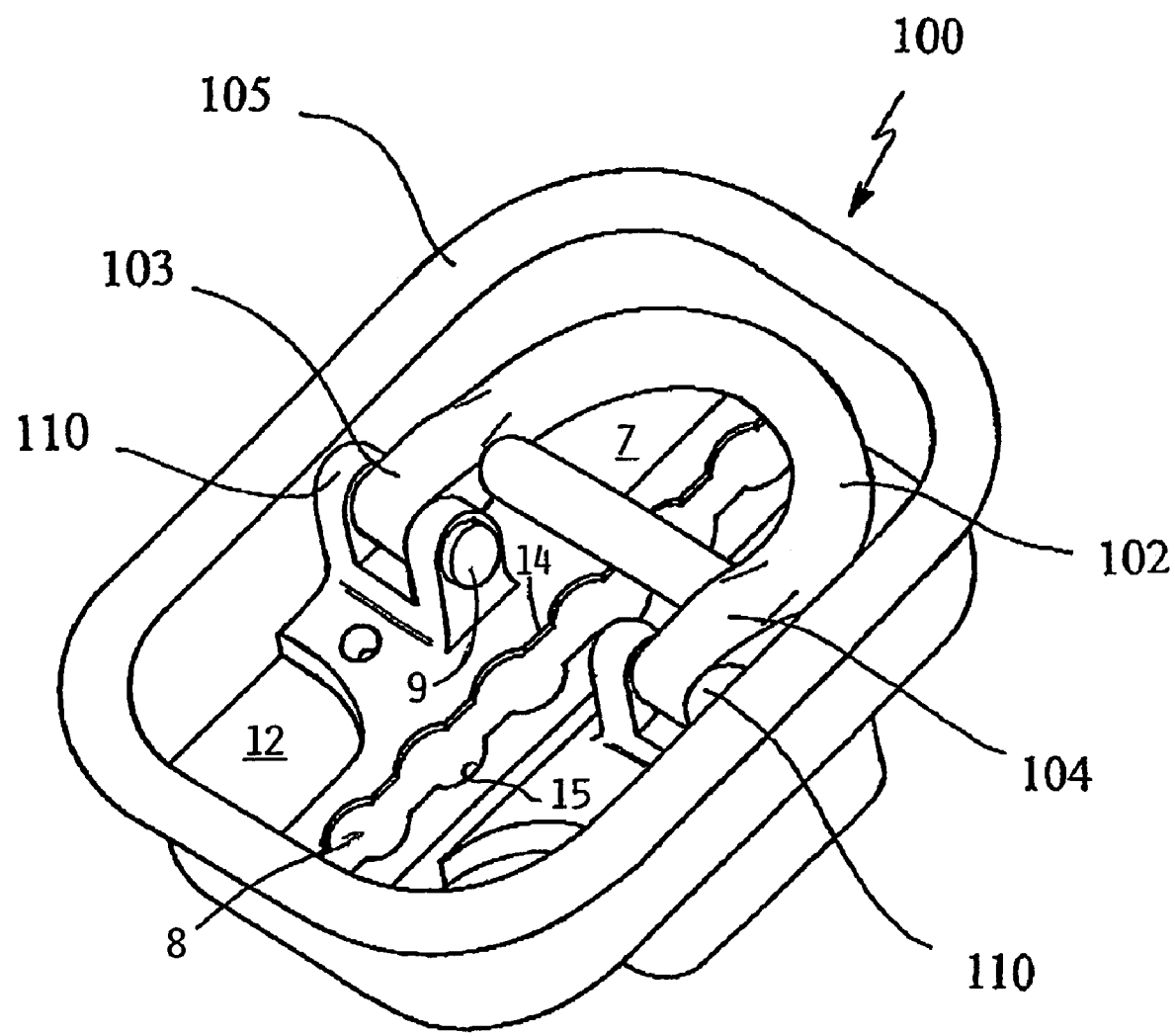
FIG. 11 is a perspective view of a modified lashing device according to the invention.

DETAILED DESCRIPTION OF A PREFERRED EXAMPLE EMBODIMENT AND OF THE BEST MODE OF THE INVENTION

FIG. 1 shows a perspective view of a lashing device 1 according to the invention. The lashing device 1 comprises a housing 5 with housing walls 6 and 6' positioned opposite each other to form an oval cross-sectional configuration. The shape of the housing is not critical. A lashing bail 2 having bail legs 3 and 4 is journaled in the housing by one or two journal pins 9. FIG. 1 shows the lashing bail 2 in its recessed position inside the housing 5. The housing 5 comprises, preferably as an integral part of the housing, a mounting member or block 7 that is rigidly secured to the housing and reaches with its free end into the space between the bail legs 3 and 4. The bail 2 forms, for example, a U-sectional configuration. The mounting block 7 is equipped with an upwardly facing mounting rail profile 8 for securing or interlocking at least one interconnecting element to the mounting member 7 and thus to the housing 5. The mounting rail profile 8 is constructed for latching or locking a load through the mounting member 7 to the loading floor, for example of an aircraft. When the profile 8 is used, the lashing bail 2 is in its recessed position as shown in FIG. 1. In this recessed position of the bail 2 the mounting rail profile 8 is accessible for the securing of at least one interconnecting element not shown in FIG. 1. The journal pin 9 is mounted in the opposite housing walls 6 and 6' and in the mounting block or member 7 which has a mounting bore 10 for this purpose. A single journal pin 9 may be used that passes entirely through the mounting member 7. Alternatively, two journal pins 9 may be used, one for each bail leg 3 and 4.

For practical purposes a multitude of lashing devices 1 are distributed on or in a loading floor of a freight space. Generally, these devices 1 are uniformly spaced from one another.

The lashing devices 1 are rigidly secured to the aircraft structure, particularly the aircraft frame structure, whereby the devices can take up substantial static forces and moments. Instead of the U-shaped bail configuration, the bail 2 may have other shapes suitable for the lashing purpose. Rectangular, square or triangular shapes may be used, for example. The housing 5 would be shaped to accommodate the shape of the bail.

FIGS. 3 and 4 show further details of the present lashing device 1. The journal pin 9 has or forms a journal axis 11. The bail 2 is tiltable about this journal axis 11. The mounting rail profile 8 comprises bores 15 and dovetail sections 14 alternating with the bores 15. FIG. 4 illustrates how the projections of the dovetail sections 14 are reaching into a groove for locking an interconnecting element in place. The interconnecting element is not shown in FIGS. 3 and 4. As shown in FIG. 7A, such an element 20 has a foot that can be inserted into the bore 15 and then moved in the direction, of the groove to be anchored by the dovetail sections 14. The tilting angle of the lashing bail will preferably be 90° or in any event sufficient for providing access to the mounting rail profile 8. The housing 5 has a bottom plate 12 shown in FIG. 4 that closes the pot-shaped housing 5 downwardly and that may be directly screwed to a support in the loading floor, preferably directly to a rib or spar of an aircraft frame. Rivets may be used instead of screws in order to secure the housing 5 to the frame. Such interconnection between the housing 5 and the frame permits the direct introduction of load imposed forces and moments into the supporting structure of the aircraft. The mounting member 7 may be an integral part of the housing 5 or it may be secured to the housing 5. The mounting rail profile 8 defines a plane positioned preferably above the journal axis 11.

The on-center spacing between the bores 15 and the dovetail sections 14 along the profile 8 is about one inch. The details of an example of the interconnecting or interlocking elements 20 are shown in FIG. 7A. The element 20 has a stem 201 and a cylindrical flat foot 202 that fits into the bore 15. After shifting the element into the dovetail section the foot 202 interlocks with the dovetail section. The stem is normally provided with a threading at its free end for securing a latching device 17 to the mounting block 7 by a nut 203. The cylindrical flat foot 202 after interlocking with the dovetail section 14 takes up forces in the XY-direction, while the stem 201 takes up forces in the Z-direction.

FIG. 5 shows a latching device 17 mounted on two identical lashing devices 1 according to the invention so positioned, that the latching device 17 is oriented longitudinally or in parallel to the longitudinal axis of the aircraft as indicated by the arrow L. Thus, the latching device 17 forms an XZ-latch. The XZ-latch 17 comprises a bridging member 19 with side walls 192 and 193 interconnected by cross-pieces 191 as best seen in FIG. 6. The cross-pieces 191 are secured to the mounting rail profile 8 by interconnecting elements 20 as described above with reference to FIG. 7A. A latching or interlocking claw 18 is mounted to the bridging element 19. The lashing devices 1 are of identical constructions, thus, identical elements are provided with identical reference numbers. The interlocking element 18 formed as a claw takes up forces in the longitudinal horizontal X-direction of the aircraft and also vertically effective forces in the Z-direction. The claw 18 engages projections or recesses in a freight piece not shown. It will be noted that in FIGS. 5 to 7A the housings of the lashing devices 1 are aligned longitudinally with the longitudinal bridging element 19. More specifically, the mounting rail profiles 8 extend with their length parallel or in line with the longitudinal axis of the bridging element 19.

Contrary to the orientation of the oval lashing device housings in FIGS. 5 to 7A, the housings of the lashing devices 1 in FIGS. 8 to 10 are oriented with their mounting rail profiles 8 at a right angle to the length of the bridging element 23 that carries a latching claw 22 and is oriented crosswise to the length L of the aircraft as indicated by the arrow Q.

The lashing devices 1 according to the invention realize a double function which is accomplished by tilting the bail 2 into the recessed position or into the operating position as shown in FIGS. 1 and 2, respectively. Further, instead of mounting bridging elements 19 or 23, other mounting components can be secured or locked to the mounting rail profile 8, whereby the lashing devices 1 can be cooperating with any other components of the freight loading system.

FIGS. 8, 9, 9A and 10 illustrate the arrangement of a further latching or interlocking element 21 as a so-called YZ-latch or interlocking device by using two identical lashing devices 1 secured to the loading floor. A bridging element 23 carrying a claw 22 is secured to each of the lashing devices 1. Cross-pieces 231 interconnect side walls of the bridging element 23. The cross-pieces 231 are secured by elements 20 as shown in FIG. 9A. The latching or interlocking device 21 is arranged crosswise to the aircraft longitudinal direction as indicated by the arrow Q. The crosspieces 231 extend longitudinally or in parallel to the respective mounting rail profile 8. The number of interconnecting elements 20 passing through the crosspieces 231 into the mounting rail profile 8 will depend on the load take-up capability required for any particular purpose.

FIG. 11 illustrates a modified embodiment of a lashing device 100 according to the invention. A box-shaped housing 105 has a rectangular configuration with rounded corners and all components are recessed in the housing 105. The mounting block 7 is provided with the mounting rail profile 8 which is also recessed in the housing 105. The lashing bail 102 is journaled by journal pins 9 to journal bucks 110 secured to the surface of the mounting block 7 inside the housing 105. The journal pins 9 pass through the journal bucks 110 and through end portions 103 and 104 of the lashing bail 102. Preferably, the journal bucks 110 have a forked configuration so that each buck has two spaced posts and so that the end portions 103, 104 of the two bail legs are positioned between two respective posts of the bucks 110. The bail 102 is shown in a recessed position. The upwardly facing surface of the bail 102 defining a first plane is positioned above a second plane defined by the surface of the mounting block 7 but below the upwardly facing rim of the housing 105. Thus, the mounting rail profile 8 is positioned below the first plane defined by the lashing bail 102. However, it is possible to position the mounting rail profile 8 at a higher level, for example coinciding with a plane in which the journal axis of the journal pin sections 9 extend. In all embodiments it must be assured, that the tilting of the lashing bail 102 into the recessed position is not impaired by the top surface of the mounting block 7.

Referring again to FIG. 4, the bail 2 defines a first plane that passes perpendicularly to the plane of the drawing centrally through the bail 2 between its outwardly facing side surfaces. Thus, the first plane defined by the bail 2 coincides with the journal axis 11 of the journal pin 9. The mounting member or block 7 defines with its upwardly facing surface a second plane that is positioned relative to the first plane, for example at a higher elevation than the first plane. In FIG. 11 the second plane is positioned below the first plane. Depending on the shape of the bail end portions 103, 104, the first plane and the second plane could coincide with the journal axis 11.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lashing device for securing a load to a loading floor in a transport conveyance, said lashing device comprising a housing (5) having a housing wall including opposite housing wall sections, a lashing bail (2) having two interconnected legs (3, 4) at least one journal pin (9) journaling said lashing bail (2) in said housing (5), a mounting member (7) rigidly mounted in said housing (5), said mounting member (7) comprising a mounting rail profile (8) configured and adapted for securing at least one interconnecting element to said mounting member (7) for locking a load through said mounting member to said loading floor when said lashing bail (2) is tilted into a recessed position in said housing (5), whereby said mounting rail profile (8) of said mounting member (7) is accessible for said securing of said at least one interconnecting element, and wherein said mounting member (7) comprises a mounting block positioned between said two interconnected legs (3, 4) of said lashing bail (2) in said housing (5), said mounting block comprising a bore (10) in axial alignment with said at least one journal pin (9) wherein said at least one journal pin (9) is mounted in said opposite housing wall sections (6, 6') of said housing (5) and in said mounting block (7) and passes through a respective end of each of said two interconnected legs (3, 4).

2. The lashing device of claim 1, wherein said lashing bail (2) defines a first plane, said at least one journal pin (9) has a journal axis (11) extending in said first plane, said lashing bail assumes said recessed position with said first plane positioned inside said housing (5), and said mounting member (7) has a top surface that defines a second plane positioned relative to said first plane.

3. The lashing device of claim 2, wherein said second plane is positioned above said journal axis flush with a rim of said housing (5).

4. The lashing device of claim 2, wherein said second plane is positioned below said first plane and thus below said journal axis.

5. The lashing device of claim 1, wherein said lashing bail (2) comprises a curved portion interconnecting said two interconnected legs (3, 4) to form a U-sectional configuration, said lashing device further comprising journal bucks (110) secured in said housing, said journal pin (9) passing through said journal bucks (110) and through respective end portions of said two interconnected legs (3, 4) of said lashing bail.

6. The lashing device of claim 5, wherein each one of said journal bucks (110) respectively has a forked configuration including two spaced posts, said end portions of said two interconnected legs are respectively positioned between two respective posts of said two spaced posts, said journal pin comprises two journal pin sections, and each one of said journal pin sections passes through a respective one of said end portions of said two interconnected legs and through a respective pair of said two spaced posts.

7. The lashing device of claim 5, wherein said journal bucks (110) are secured to said mounting member (7) in said housing (105).

8. A lashing device for securing a load to a loading floor in a transport conveyance, said lashing device comprising a housing (5), a lashing bail (2) having two interconnected legs (3, 4), at least one journal pin (9) journaling said lashing bail (2) in said housing (5), a mounting member (7) rigidly mounted in said housing (5), said mounting member (7) comprising a mounting rail profile (8) configured and adapted for securing at least one interconnecting element to said mounting member (7) for locking a load through said mounting member to said loading floor when said lashing bail (2) is tilted into a recessed position in said housing (5), whereby said mounting rail profile (8) of said mounting member (7) is accessible for said securing of said at least one interconnecting element, wherein said mounting rail profile (8) of said mounting member (7) comprises groove sections (14) and bore sections (15) alternating with each other along said mounting rail profile (8), said groove sections (14) having a dovetail sectional configuration for interlocking with said interconnecting element.

9. The lashing device of claim 8, further comprising an interconnecting element constructed as a load locking element for connecting other components to said mounting rail profile (8).

10. The lashing device of claim 1, wherein said housing (5) and said mounting member (7) together form an integral unit to which said lashing bail is journaled.

11. The lashing device of claim 1, wherein said housing (5) encloses an open space between said housing wall and said mounting member (7), and wherein said lashing bail (2) is positioned in said open space in said recessed position of said lashing bail.

12. A freight lashing and latching system comprising a first lashing device and a second lashing device as defined in claim 1, said system further comprising at least one bridging member (19, 23) having a first end connected to said mounting member of said first lashing device by at least one first interconnecting element (20) and a second end connected to said second lashing device by at least one second interconnecting element (20), when said lashing bail of each of said first and second lashing devices is in said recessed position.

13. The system of claim 12, further comprising at least one latch (18, 22) positioned on said bridging member intermediate said first and second ends.

14. The lashing device of claim 1, wherein said housing (5) comprises a housing bottom (12) for connecting said housing (5) to a support.

15. The lashing device of claim 1, wherein said mounting rail profile comprises a longitudinally extending elongated rail member having a groove extending longitudinally therealong, said groove has a recessed sectional profile in a top surface of said rail member, and said groove is configured and adapted for securing the interconnecting element into said groove.

16. The lashing device of claim 15, wherein said recessed sectional profile of said groove comprises an undercut dovetail configuration.

17. The lashing device of claim 15, wherein said rail member and said groove extend longitudinally in a direction perpendicularly crossing a journal axis (11) of said at least one journal pin.

* * * * *